Sept. 11, 1934.  H. H. GLASIER  1,973,309
GROUND TURNER
Filed Nov. 11, 1932
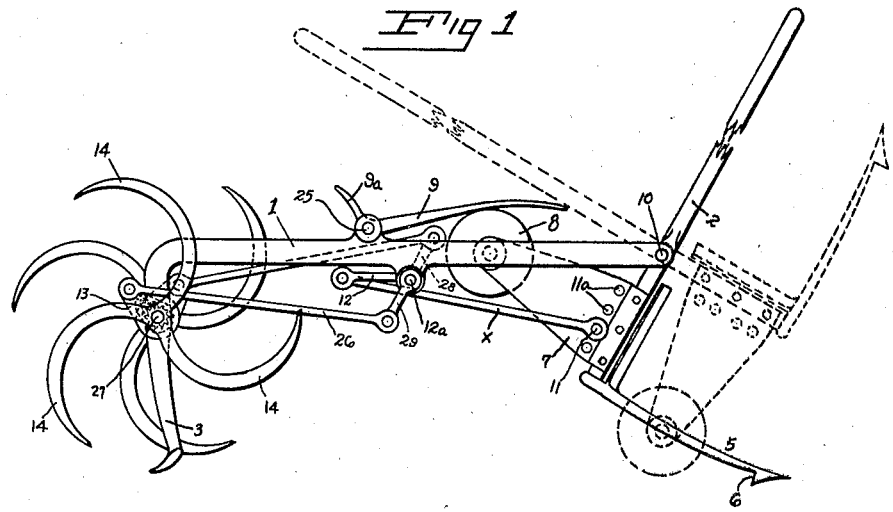
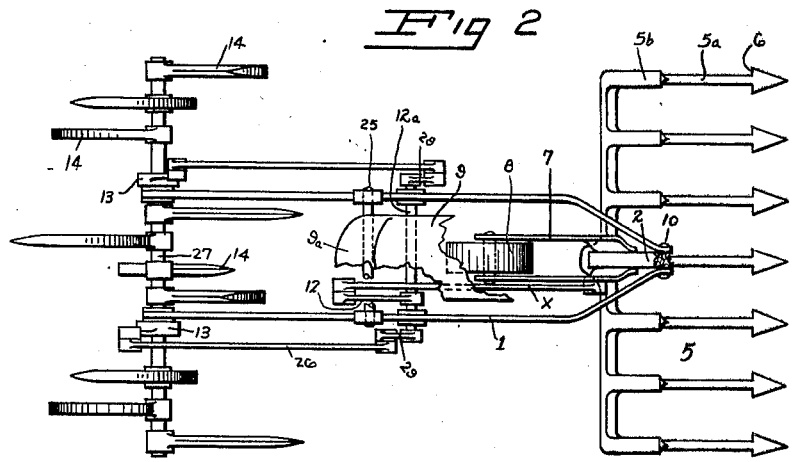
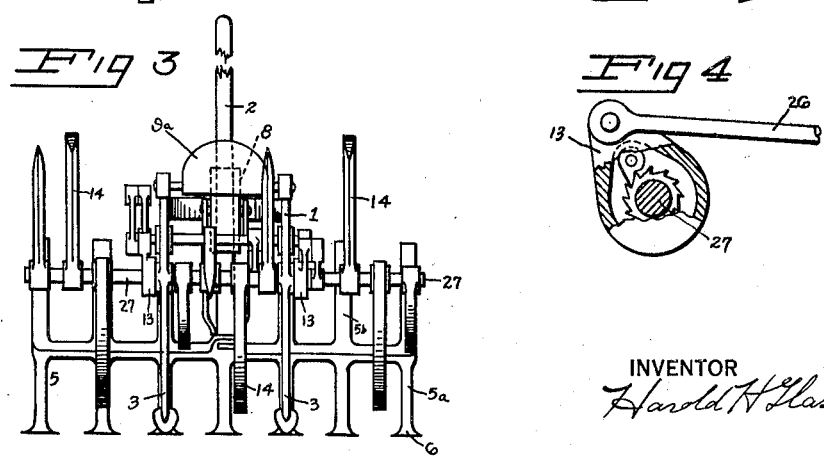
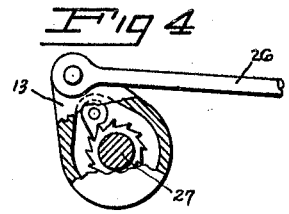
INVENTOR
Harold H Glasier Patented Sept. 11, 1934

1,973,309

UNITED STATES PATENT OFFICE 1,973,309

GROUND TURNER

Harold H. Glasier, Los Angeles, Calif.

Application November 11, 1932, Serial No. 642,219

4 Claims. (Cl. 97—58)

This invention relates to a mechanical ground turner which is especially adapted to small farms and gardens because of its lightness and compactness, making it suitable for work in small plots and closely planted ground. It acts in the manner of a spade altho it may be made to produce a complete seed bed in one operation. It may be actuated manually or by power. It is herein disclosed in its simplest form, the manual type.

It is an object of this invention to provide a ground turner of the character described having a reciprocating element for breaking out the ground and a rotary element for turning the broken out ground over and pulverizing it. It is another object of this invention to provide a ground anchorage whereby the reciprocating element may brace itself for the heavy work of breaking out the ground. It is a further object to provide claws on the reciprocating element to enable it to obtain a pivot point on the ground upon which it may turn to effect forward travel. These objects, together with other objects and corresponding accomplishments are obtained by means of the embodiment of my invention, illustrated in the accompanying drawing, in which Fig. 1 is a side elevation, Fig. 2 a plan view, Fig. 3 an end view and Fig. 4 a sectional view of the ratchet mechanism.

Referring to the drawing, 1 is a frame, at the forward end of which is pivoted the lever 2 and at the rearward end are extended the gripping feet 3 which brace against the ground when pressure is exerted upon them as the lever is drawn backward. As the lever is swung forward, to the right in the drawing, the gripping feet slide readily over the ground, offering no resistance. At the upper end of the lever are handles 4; at the lower end is the breaking tool 5, consisting of horizontally ranging blades 5A and vertically ranging blades 5B. Toward the point of blades 5A the claws 6 are formed. These incline backward, facing in an opposite direction to the breaking tool. Located behind blades 5A are the extensions 7 carrying wheels 8. These wheels serve two functions. Their first is as carrier wheels when it is desired to move the implement from place to place. To so function, they are swung into contact with the ground by moving the lever 2 to the extreme left, after first uncoupling drive rod X. The second function of wheels 8 is as a means to receive the thrust of pedal 9 and transfer it to lever 2. Pedal 9 which pivots at pin 25 is a supplement to lever 2 and provides means for the operator of the implement to work with his feet as well as his arms. The pedal is equipped with a guard 9A for the operator's protection against the revolving member 14.

At an adjustable distance from the fulcrum 10 drive rod X is attached by means of a readily disconnected pin 11 to any of the holes 11A in the extension or standard 7. By means of this rod X, motion is transmitted from the lever 2 to the cross bar 12 which consists of a shaft 12A running across the frame members 1 with an upstanding lever 28 on one side and a downstanding lever 29 on the opposite side. These levers are each connected by means of rods 26 to an enclosed ratchet drive 13 one of course being on either side of the turning tool 14. Because of the upstanding and downstanding levers 28 and 29 respectively of the cross bar 12, opposing motion is transmitted to the two ratchet drives so either one or the other is always driving the rotary turning tool 14 which causes the tool to rotate continuously. The speed of rotation may be varied by varying the position of the coupling 11, the closer to the fulcrum 10, the shorter the stroke and the less speed developed consequently at the ratchet drive.

The method of rotating the turning tool is not limited to the method herein described as any means of converting the reciprocating motion of the breaking tool to the rotary motion of the turning tool may be employed.

The turning tool is a series of crescent shaped arms 14 or prongs with pointed ends and flat inner faces, converged about a hub or axle 27 and spaced in any number of rows. The rows may run straight or spirally across the hub. The tool may be made to turn in either direction and at a slow or reasonably fast speed. The faster the speed, the finer the tilth produced altho too high a speed results in the formation of a fine dust which is not desirable as it packs too severely when moistened. There is no danger of this kind in the manually propelled tools but in the power propelled, precautions must be taken.

In the operation of the device, the lever 2 is swung to the left, or backwards, which causes the breaking tool 5A to penetrate the ground and then to break out a portion of the ground so penetrated. Meanwhile the turning tool has been revolving and has turned over and shattered the previously broken out ground. When the lever 2 has reached the extremity of its backward stroke, it is swung forward, to the right, whereupon the claws 6 grip the ground and hold the breaking tool 5 from moving backward. In this stationary position, the tool 5 acts as the pivot point for the lever 2 and as the lever is swung forward, it draws frame 1 forward and the implement progresses over the land in this manner. Upon the completion of the forward stroke of the lever, the breaking tool 5 has been thereby placed in a backward and downwardly pointing position and is again ready to penetrate and break out another portion of ground. Meanwhile the turning tool has revolved and filled its arms with a quantity of broken out ground and delivered another quantity of broken out ground from other arms, back upon the land in an upside down position.

By utilizing two elements for the working or turning the ground, the difficult work of breaking may be confined to a slow-moving, powerful tool, which is equal to the work and not easily damaged by contact with rocks and roots and the lighter work of turning the loosened ground may be done by a faster tool, which, due to its speed and many arms, does a very finished job.

What I claim is:

1. A ground turner comprising a frame with ground anchoring feet fixed to the rear thereof, a lever pivoted to the front of said frame, handles provided at the upper extremity of said lever, a ground breaking tool fixed to the lower extremity of said lever, ground gripping claws formed on said ground breaking tool, a carrier wheel mounted at the back of the lower portion of said lever, a rotary ground turning and harrowing tool journalled toward the rear of the aforesaid frame, and mechanism to propel the rotating ground turner from the oscillating ground breaker.

2. A ground turner comprising a frame with ground anchoring feet fixed to the rear thereof and a lever pivoted to the front thereof having handles at its upper extremity, a ground breaking tool attached to the lower extremity of said lever, said tool having forwardly extending blades with ground gripping claws formed thereon, a rearwardly extending standard placed adjacent to said breaking tool, said standard having a carrier wheel journalled thereto which does not contact the ground while the implement is functioning, a pedal lever pivoted toward the rear of the aforesaid frame and bearing at its unattached end upon the aforesaid carrier wheel so as to convey motion from one to the other, a rotary ground turning tool having involute arms with spading surfaces, and mechanism to propel the rotary tool from the motion of the oscillating tool.

3. A ground turner comprising a frame with ground anchoring feet attached thereto for the purpose of intermittently gripping the ground, a lever pivoted toward the front of said frame having handles at its upper extremity, a ground breaking tool mounted at the lower extremity of said lever, said tool having forwardly ranging blades pointed forwardly with backwardly pointing claws formed under the points of said forwardly extending blades, vertically extending blades placed adjacent to said forwardly extending blades on the lower portion of the aforesaid lever, a carrier wheel which may be swung in contact with the ground at option, a ground turning tool having involute arms with spading surfaces, ratchet wheels mounted within enclosures on either side of said turning tool, pawls engaging each ratchet wheel, rods connecting each pawl with an upper and a lower lever respectively on a crossbar which is oscillated by motion from the aforesaid lever, and a rod connecting said cross bar with said lever having a quick action coupling and a variety of coupling points.

4. A ground turner having in combination with propelling mechanism a backwardly piercing ground anchor, a rotary turning and harrowing tool synchronized with a forwardly piercing oscillating breaking tool which functions on a forwardly ranging course below the ground surface, and claws formed on the points of said breaking tool for the purpose of gripping the ground to effect a buckling of the rear portion of the implement over the front portion of the implement by holding the front portion of said implement stationary while the rear portion of said implement is drawn over said front portion thereby producing forward travel of the implement.

HAROLD H. GLASIER.